(12) United States Patent
Chen et al.

(10) Patent No.: US 9,344,542 B2
(45) Date of Patent: May 17, 2016

(54) TECHNIQUES TO GENERATE CONTEXT INFORMATION

(75) Inventors: Lang S. Chen, Oakland, CA (US); Peter Skillman, San Carlos, CA (US); David G. Champlin, Menlo Park, CA (US); Robert Haitani, Menlo Park, CA (US); Tina Tseng, San Jose, CA (US); Srikiran Prasad, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1225 days.

(21) Appl. No.: 11/316,645

(22) Filed: Dec. 21, 2005

(65) Prior Publication Data

US 2007/0142078 A1  Jun. 21, 2007

(51) Int. Cl.
| | |
|---|---|
| *H04M 3/42* | (2006.01) |
| *H04M 1/57* | (2006.01) |
| *H04W 76/00* | (2009.01) |
| *H04N 21/478* | (2011.01) |

(Continued)

(52) U.S. Cl.
CPC .............. *H04M 1/575* (2013.01); *H04M 1/576* (2013.01); *H04M 1/72569* (2013.01); *H04N 21/478* (2013.01); *H04W 76/007* (2013.01); *H04M 1/274516* (2013.01); *H04M 1/72561* (2013.01); *H04N 2005/4412* (2013.01)

(58) Field of Classification Search
CPC ..................... H04M 3/42042; H04M 2242/22; H04M 1/57; H04M 3/436; H04M 3/42059; H04M 15/90; H04M 3/42093; H04M 3/385; H04M 3/387; H04M 1/575; H04M 2250/60; H04M 11/00; H04M 11/007; H04M 1/274508; H04M 1/274583; H04M 1/576; H04Q 2213/13282; H04N 21/478; H04N 2005/4412; H04N 21/214; H04N 21/25891; H04W 4/22; H04W 76/007
USPC ........... 455/556.1, 415, 418, 569.2, 566, 417, 455/445, 461, 411, 410, 414.1, 419; 709/223, 203; 707/705, 706, 769, 802; 379/142.04, 210.02, 88.21, 142.05, 379/142.02, 142.06, 201.01, 207.13
See application file for complete search history.

(56) References Cited

U.S. PATENT DOCUMENTS

| | | | |
|---|---|---|---|
| 6,459,782 B1 * | 10/2002 | Bedrosian et al. | ....... 379/201.08 |
| 6,498,797 B1 | 12/2002 | Anerousis et al. | |

(Continued)

FOREIGN PATENT DOCUMENTS

| | | |
|---|---|---|
| EP | 1143667 A2 | 10/2001 |
| EP | 1396989 A2 | 3/2004 |

(Continued)

OTHER PUBLICATIONS

Supplementary European Search Report—EP06848700—Search Authority—Munich—Jul. 9, 2009.

*Primary Examiner* — Fred Casca
(74) *Attorney, Agent, or Firm* — Norton Rose Fulbright US LLP (57) ABSTRACT

Techniques to generate context information are described. An apparatus may comprise a mobile computing device. The mobile computing device may include a radio sub-system, a processing sub-system to couple to the radio sub-system, and a context information management module for execution by the processing sub-system. The context information management module may search for context information associated with a contact identifier using a context information database.

17 Claims, 5 Drawing Sheets

(51) Int. Cl.
*H04N 5/44* (2011.01)
*H04M 1/2745* (2006.01)
*H04M 1/725* (2006.01)

(56) References Cited

U.S. PATENT DOCUMENTS

| | | | |
|---|---|---|---|
| 6,813,344 B1 | 11/2004 | Lemke | |
| 2001/0007088 A1* | 7/2001 | Winter et al. | 701/208 |
| 2002/0078045 A1* | 6/2002 | Dutta | 707/7 |
| 2002/0116384 A1* | 8/2002 | Laurila et al. | 707/10 |
| 2002/0141555 A1* | 10/2002 | Kim | 379/142.04 |
| 2003/0063732 A1* | 4/2003 | Mcknight | 379/210.01 |
| 2004/0068502 A1 | 4/2004 | Vogedes et al. | |
| 2004/0253963 A1 | 12/2004 | Park et al. | |
| 2005/0282489 A1* | 12/2005 | Kamdar et al. | 455/3.02 |
| 2006/0224624 A1* | 10/2006 | Korn et al. | 707/104.1 |
| 2006/0224938 A1* | 10/2006 | Fikes et al. | 715/500 |
| 2006/0281490 A1* | 12/2006 | Dolgas et al. | 455/556.2 |
| 2006/0293083 A1* | 12/2006 | Bowen | 455/558 |
| 2007/0072648 A1* | 3/2007 | Stoops | 455/566 |
| 2007/0106728 A1* | 5/2007 | Adams et al. | 709/206 |
| 2007/0124452 A1* | 5/2007 | Mohammed | 709/223 |

FOREIGN PATENT DOCUMENTS

| | | |
|---|---|---|
| WO | 03073732 A1 | 9/2003 |
| WO | WO-2004095368 A2 | 11/2004 |
| WO | 2007073558 A2 | 6/2007 |

\* cited by examiner

TECHNIQUES TO GENERATE CONTEXT INFORMATION

BACKGROUND

A mobile computing device such as a smartphone may have voice and data communications capabilities as well as processing capabilities. For incoming telephone calls, a mobile computing device typically attempts to display some information about the incoming telephone call, such as a telephone number of the calling device, a caller name, and so forth. To retrieve such information, the mobile computing device typically searches a personal contact list from a personal information manager application using the incoming telephone number. The displayed information may assist a user in determining whether to answer the incoming telephone call. If the personal contact list does not contain contact information associated with the incoming telephone number, the mobile computing device typically defaults to displaying simply the incoming telephone number. The incoming telephone number by itself, however, may not provide sufficient information for a user to determine whether to answer the incoming telephone call. Consequently, there may be a need for improved techniques to solve these and other problems.

DETAILED DESCRIPTION

Various embodiments may be directed to a mobile computing device such as a smartphone that is capable of displaying context information for a telephone number associated with an incoming telephone call request. The context information may include any information associated with the incoming telephone number that may assist a user in identifying the calling party or provide a context for a telephone call. For example, the mobile computing device may search for context information using a personal information manager (PIM) application resident on some mobile computing devices, and/or use a wireless data connection to access various context information databases in order to search for certain types of context information typically not available with a PIM application or beyond the scope of a PIM application. Furthermore, a user may define a set of parameters and definitions to specify the particular type of context information a user would like to be displayed. In this manner, a user may personalize how incoming telephone calls are to be displayed to the user, or make a more informed decision as to whether to answer a telephone call. Other embodiments are described and claimed.

Figure 1:
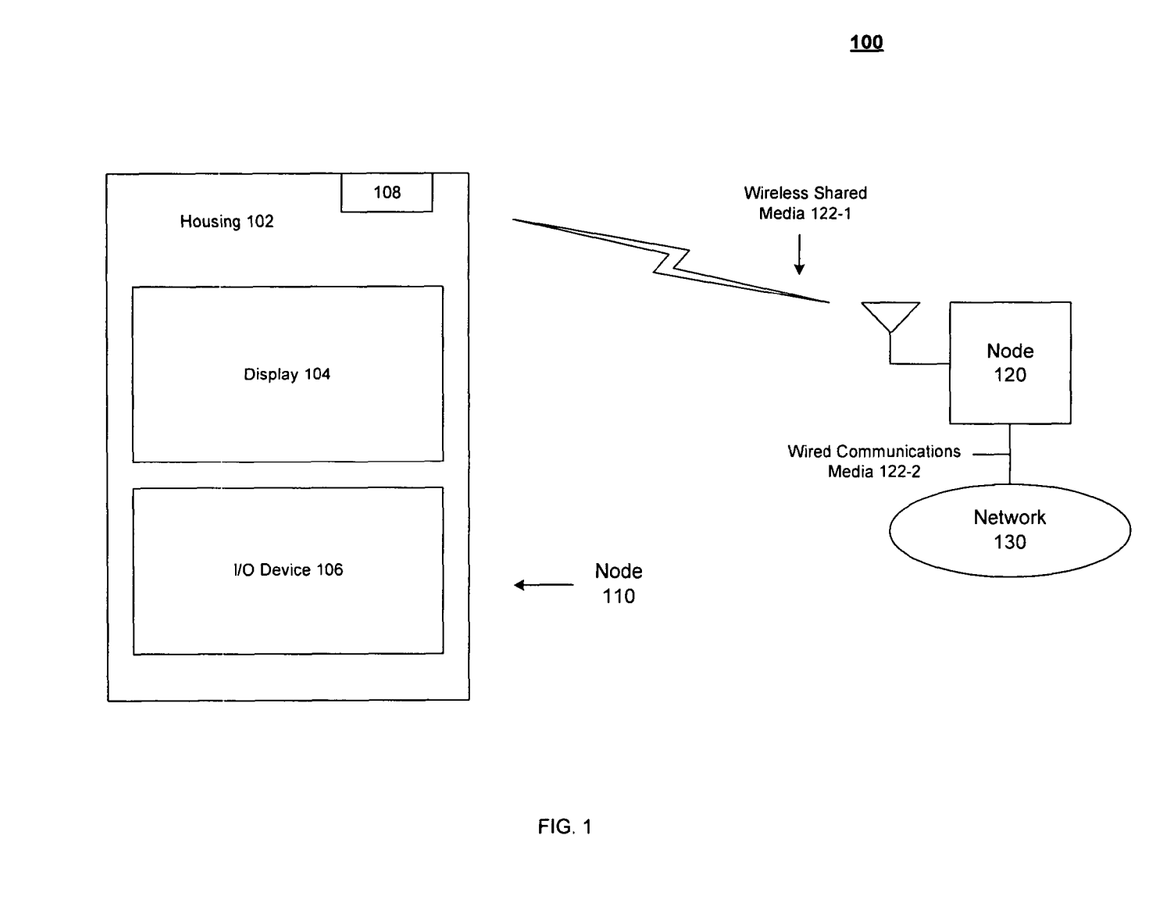
FIG. 1 illustrates one embodiment of a system.

FIG. 1 illustrates one embodiment of a communications system 100. In various embodiments, communications system 100 may be implemented as a wireless communication system, a wired communication system, or a combination of both. When implemented as a wireless communication system, communications system 100 may include components and interfaces suitable for communicating over wireless shared media 122-1, such as one or more antennas, transmitters, receivers, transceivers, amplifiers, filters, control logic, and so forth. An example of wireless shared media 122-1 may include portions of a wireless spectrum, such as the RF spectrum and so forth. When implemented as a wired communications system, communications system 100 may include components and interfaces suitable for communicating over wired communications media 122-2, such as input/output (I/O) adapters, physical connectors to connect the I/O adapter with a corresponding wired communications medium, a network interface card (NIC), disc controller, video controller, audio controller, and so forth. Examples of wired communications media 122-2 may include a wire, cable, metal leads, printed circuit board (PCB), backplane, switch fabric, semiconductor material, twisted-pair wire, co-axial cable, fiber optics, and so forth. The embodiments are not limited in this context.

In various embodiments, communications system 100 may include a mobile computing device 110. Mobile computing device 10 may comprise any device having a processing system and a portable power source (e.g., a battery). Examples of a mobile computing device may include a laptop computer, ultra-laptop computer, portable computer, handheld computer, palmtop computer, personal digital assistant (PDA), cellular telephone, combination cellular telephone/PDA, smart phone, pager, one-way pager, two-way pager, messaging device, data communication device, and so forth. Examples of a mobile computing device may also include computers that are arranged to be worn by a person, such as a wrist computer, finger computer, ring computer, eyeglass computer, belt-clip computer, arm-band computer, shoe computers, clothing computers, and other wearable computers. In one embodiment, for example, mobile computing device 110 may be implemented as a smart phone having both wireless communication capabilities (e.g., voice and/or data communications) and processing capabilities. Although some embodiments may be described with mobile computing device 110 implemented as a smart phone by way of example, it may be appreciated that other embodiments may be implemented using other mobile computing devices as well. The embodiments are not limited in this context.

As shown in FIG. 1, mobile computing device 10 may comprise a housing 102, a display 104, an input/output (I/O) device 106, and an antenna 108. Display 104 may comprise any suitable display unit for displaying information appropriate for a mobile computing device. I/O device 106 may comprise any suitable I/O device for entering information into a mobile computing device. Examples for I/O device 106 may include an alphanumeric keyboard, a numeric keypad, a touch pad, input keys, buttons, switches, rocker switches, and so forth. The embodiments are not limited in this context.

In one embodiment, communications system 100 may include a wireless device 120. Wireless device 120 may comprise, for example, a mobile or fixed wireless device. In one embodiment, for example, wireless device 120 may comprise a fixed wireless device operating as an access point for a network or communications system, such as a cellular radiotelephone communications system, a wireless local area network (WLAN), a wireless metropolitan area network (WMAN), a wireless wide area network (WWAN), and so forth. Examples for wireless device 120 may include a wireless access point, base station or device B, base station radio/transceiver, router, switch, hub, gateway, and so forth. In one embodiment, for example, wireless device 120 may comprise a base station for a cellular radiotelephone communications system. Although some embodiments may be described with wireless device 120 implemented as a base station by way of example, it may be appreciated that other embodiments may be implemented using other wireless devices as well. The embodiments are not limited in this context.

In one embodiment, mobile computing device 110 and wireless device 120 may comprise part of a cellular communication system. Examples of cellular communication systems may include Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) cellular radiotelephone systems, Extended-TDMA (E-TDMA) cellular radiotelephone systems, Narrowband Advanced Mobile Phone Service (NAMPS) cellular radiotelephone systems, third generation (3G) systems such as Wide-band CDMA (WCDMA), CDMA-2000, Universal Mobile Telephone System (UMTS) cellular radiotelephone systems compliant with the Third-Generation Partnership Project (3GPP), and so forth. The embodiments are not limited in this context.

In addition to voice communication services, mobile computing device 110 and wireless device 120 may be arranged to perform data communications using any number of different wireless protocols over wireless shared media 122-1. In one embodiment, for example, mobile computing device 110 and wireless device 120 may be arranged to perform data communications using any number of different WWAN data communication services. Examples of cellular data communication systems offering WWAN data communication services may include GSM with General Packet Radio Service (GPRS) systems (GSM/GPRS), CDMA/1×RTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, and so forth. In one embodiment, for example, mobile computing device 110 and wireless device 120 may also be arranged to communicate using a number of different WLAN data communication services. Examples of suitable WLAN data communication services may include the Institute of Electrical and Electronics Engineers (IEEE) 802.xx series of protocols, such as IEEE 802.11a/b/g/n, IEEE 802.16, IEEE 802.20, and so forth. In one embodiment, for example, mobile computing device 110 and wireless device 120 may be further arranged to communicate using a number of shorter range wireless protocols, such as a wireless personal area network (PAN) protocols, an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may include near-field communication techniques and protocols, such as electro-magnetic induction (EMI) techniques. An example of EMI techniques may include passive or active radio-frequency identification (RFID) protocols and devices. The embodiments are not limited in this respect.

In one embodiment, communication system 100 may include network 130 connected to wireless device 120 by wired communications medium 122-2. Network 130 may comprise additional nodes and connections to other networks, including a voice/data network such as the Public Switched Telephone Network (PSTN), a packet network such as the Internet, a local area network (LAN), a metropolitan area network (MAN), a wide area network (WAN), an enterprise network, a private network, and so forth. In one embodiment, for example, network 130 may be arranged to communicate information in accordance with one or more Internet protocols as defined by the Internet Engineering Task Force (IETF), such as the Transmission Control Protocol/Internet Protocol (TCP/IP), for example. Network 130 may also include other cellular radio telephone system infrastructure and equipment, such as base stations, mobile subscriber centers, central offices, and so forth. The embodiments are not limited in this context.

In various embodiments, mobile computing device 110 may comprise a smartphone having processing capabilities as well as voice and/or data communications capabilities. Mobile computing device 110 may use the processing capabilities to perform certain call processing operations previously unavailable, or available only through the network provider. For example, caller identification is a desirable application for many users. For incoming telephone calls, a mobile computing device typically searches a personal contact list using the incoming telephone number to display some information about the caller, such as a name and type of number (e.g., work, home, mobile, and so forth). Examples of a personal contact list may include an address book for a user maintained using some form of personal information manager application software or contact management application software, such as Microsoft® Outlook™, Palm® Contacts, and so forth. Such information may assist a user in determining whether to answer the incoming telephone call. If the personal contact list does not contain contact information associated with the incoming telephone number, however, mobile computing device 110 may be limited to displaying only the incoming telephone number. The incoming telephone number by itself may not provide sufficient information for a user to determine whether to answer the incoming telephone call.

Various embodiments may address these and other problems. Various embodiments may be directed to a mobile computing device such as a smartphone that is capable of displaying context information for a contact identifier. A contact identifier may comprise any unique identifier capable of identifying a user, such as a telephone number, an email address, a network address, an Internet Protocol (IP) address, an IP version 4 (IPv4) address, an IP version 6 (IPv6) address, a universal resource locator (URL), a domain name, a hardware address (e.g., a media access controller address), Voice Over IP (VoIP) or Voice Over Packet (VOP) tags, instant messaging (IM) addresses, Skype accounts, photo tags, location information, and so forth. The contact identifier may vary in accordance with the type of communication technique used to communicate information. For example, the contact identifier may comprise a telephone number when the type of communication technique is telephone call. In another example, the contact identifier may comprise an IP address when the type of communication technique is an incoming VoIP telephone call or file transfer protocol (FTP) request. In yet another example, the contact identifier may comprise an email address when the type of communication technique is an incoming email or IM message. In various embodiments, examples may be given with the contact identifier comprising a telephone number and the communication technique comprising a telephone call. It may be appreciated, however, that the types of contact identifiers and communication techniques may vary as desired for a given implementation, and the embodiments are not limited in this context.

In one embodiment, for example, a smartphone may be arranged to display context information for a contact identifier, such as a telephone number. The telephone number may be, for example, a number associated with a call request for an incoming telephone call. In one embodiment, for example, mobile computing device 110 may include a radio sub-system, a processing sub-system coupled to the radio sub-system, and a context information management module for execution by the processing sub-system. The context information management module may search for context information associated with a telephone number for an incoming telephone call request using a context information database, and display the context information via display 104 for a user. For example, mobile computing device 10 may use the radio sub-system to establish a wireless data connection. The context information management module may use the data connection to access various context information databases. Alternatively, mobile computing device 110 may store various context information databases locally to reduce latency in retrieving the desired context information, or when a data connection may not be established. The context information management module may search for the context information in accordance with a set of parameters and definitions defined using a context information interface module. The context information interface module may also contain control instructions regarding how the context information is displayed by display 104. System 100 in general, and mobile computing device 110 in particular, may be described in more detail with reference to FIG. 2.

Figure 2:
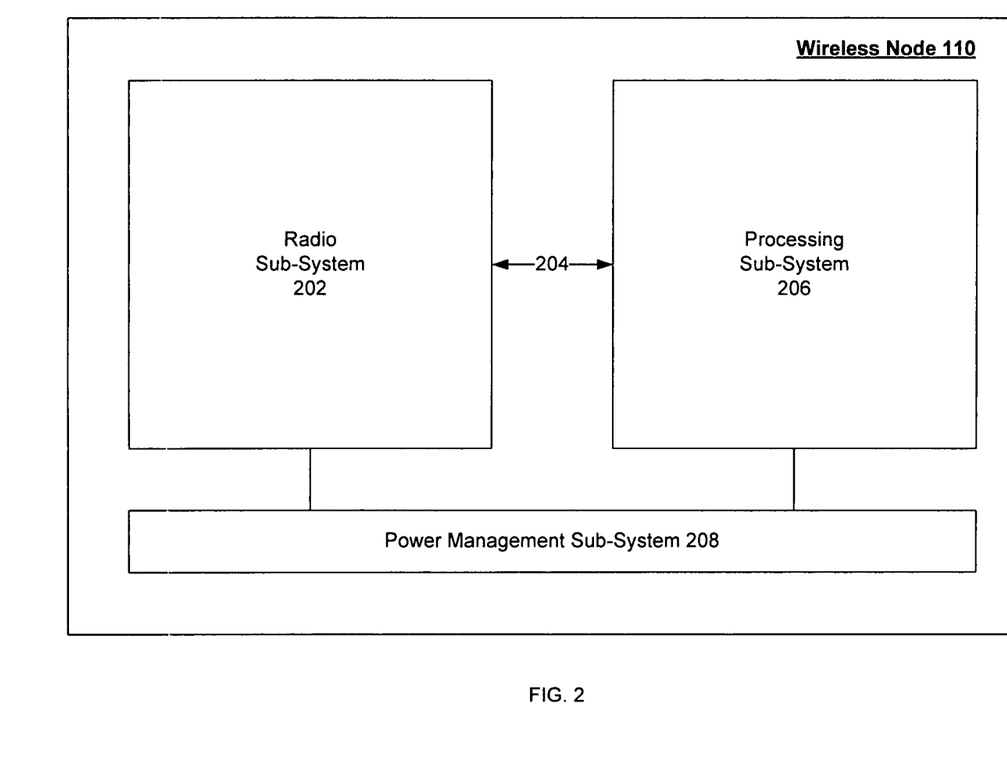
FIG. 2 illustrates one embodiment of a node.

FIG. 2 illustrates one embodiment a node. FIG. 2 illustrates a more detailed block diagram of mobile computing device 110 as described with reference to FIG. 1. As shown in FIG. 2, mobile computing device 110 may comprise multiple elements. Although FIG. 2 shows a limited number of elements in a certain topology by way of example, it can be appreciated that more or less elements in any suitable topology may be used in mobile computing device 110 as desired for a given implementation. Furthermore, any element as described herein may be implemented using hardware, software, or a combination of both, as previously described with reference to node implementations. The embodiments are not limited in this context.

In various embodiments, mobile computing device 10 may include a radio sub-system 202 connected via bus 204 to a processing sub-system 206. Radio sub-system 202 may perform voice and data communications operations using wireless shared media 122-1 for mobile computing device 110. Processing sub-system 206 may execute software for mobile computing device 110. Bus 204 may comprise a USB or micro-USB bus and appropriate interfaces, as well as others.

in various embodiments, mobile computing device 110 may also include a power management sub-system 208. Power management sub-system 208 may manage power for mobile computing device 10, including radio sub-system 202, processing sub-system 206, and other elements of mobile computing device 110. For example, power management sub-system 208 may include one or more batteries to provide direct current (DC) power, and one or more alternating current (AC) interfaces to draw power from a standard AC main power supply. The embodiments are not limited in this context.

Figure 3:
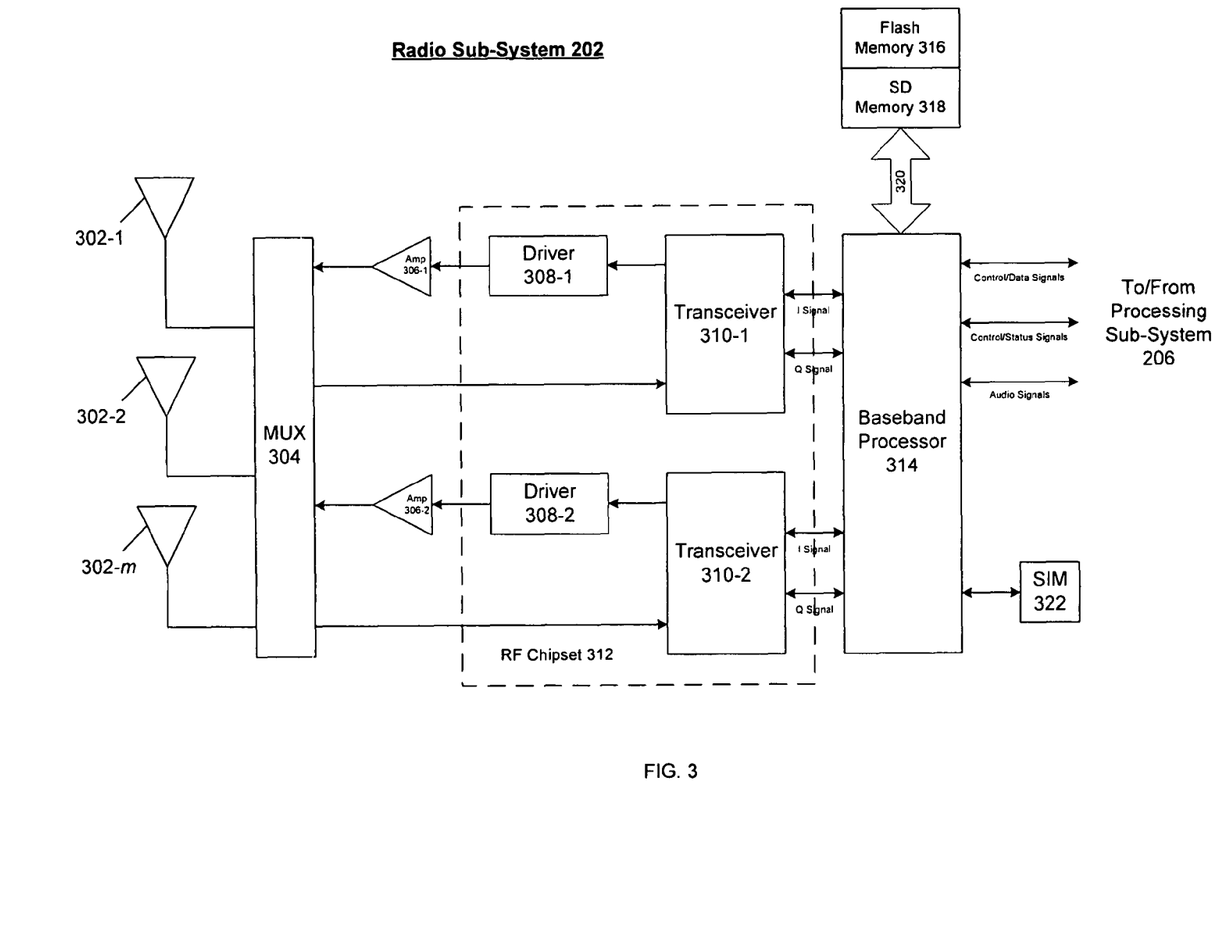
FIG. 3 illustrates one embodiment of a radio sub-system.

FIG. 3 illustrates one embodiment a radio sub-system. FIG. 3 illustrates a more detailed block diagram of radio sub-system 202 as described with reference to FIG. 2. Radio sub-system 202 may perform voice and data communication operations for mobile computing device 110. For example, radio sub-system 202 may be arranged to communicate voice information and control information over one or more assigned frequency bands of wireless shared media 122-1. The embodiments are not meant to be limited, however, to the example given in FIG. 3.

In various embodiments, radio sub-system 202 may include one or more antennas 302-1-$m$. Antennas 302-1-$m$ may be used for transmitting and/or receiving electrical signals. Examples for antennas 302-1-$m$ may include an internal antenna, an omni-directional antenna, a monopole antenna, a dipole antenna, an end fed antenna, a circularly polarized antenna, a micro-strip antenna, a diversity antenna, a dual antenna, an antenna array, a helical antenna, and so forth. During transmission, antennas 302-1-$m$ may accept energy from a transmission line and radiate this energy into space via wireless shared media 122-1. During reception, antennas 302-1-$m$ may gather energy from an incident wave received over wireless shared media 122-1, and provide this energy to a corresponding transmission line. The amount of power radiated from or received by antennas 302-1-$m$ is typically described in terms of gain. Radio sub-system 202 may be implemented using a single antenna 302-1, or using an array of antennas 302-1-$m$ array, such as a quad band antenna array, for example. Multiple antennas may be desirable when implementing spatial diversity and/or Multiple-Input-Multiple-Output (MIMO) systems. The embodiments are not limited in this context.

In various embodiments, antennas 302-1-$m$ may be connected to a multiplexer 304. Multiplexer 304 multiplexes signals from power amplifiers 306-1, 306-2 for delivery to antennas 302-1-$m$. Multiplexer 304 demultiplexes signals received from antennas 302-1-$m$ for delivery to RF chipset 312. The embodiments are not limited in this context.

In various embodiments, multiplexer 304 may be connected to power amplifiers 306-1, 306-2. Power amplifiers 306-1, 306-2 may be used to amplify any signals to be transmitted over wireless shared media 122-1. Power amplifiers 306-1, 306-2 may work in all assigned frequency bands, such as 4 frequency bands in a quad-band system. Power amplifiers 306-1, 306-2 may also operate in various modulation modes, such as Gaussian Minimum Shift Keying (GSMK) modulation suitable for GSM systems and 8-ary Phase Shift Keying (8-PSK) modulation suitable for EDGE systems. The embodiments are not limited in this context.

In various embodiments, power amplifiers 306-1, 306-2 may be connected to an RF chipset 312. RF chipset 312 may also be connected to multiplexer 304. In one embodiment, for example, RF chipset 312 may comprise one or more transceivers in a transceiver array. For example, RF chipset 312 may include RF drivers 308-1, 308-2 each coupled to RF transceivers 10-1, 310-2, respectively. RF chipset 312 performs all of the modulation and direct conversion operations required for GMSK and 8-PSK signal types for quad-band E-GPRS radio. RF chipset 312 receives analog I & Q signals from a baseband processor 314, and converts them to an RF signal suitable for amplification by power amplifiers 306-1, 306-2. Similarly, RF chipset 312 converts the signals received from wireless shared media 122-1 via antennas 302-1-$m$ and multiplexer 304 to analog I & Q signals to be sent to baseband processor 314. RF chipset 312 may be implemented using one or more chips as desired for a given implementation. The embodiments are not limited in this context.

In some embodiments, each transceiver 310-1, 310-2 may be arranged to perform data communications in accordance with a different set of wireless communications protocols and techniques. In one embodiment, for example, transceiver 310-1 may be arranged to communicate information in accordance with a first class of wireless communications protocols and techniques that are generally associated with cellular radiotelephone communication systems. Examples of the first class of protocols may include WWAN protocols, such as GSM/GPRS protocols, CDMA/1xRTT protocols, EDGE protocols, EV-DO protocols, EV-DV protocols, HSDPA protocols, and so forth. In one embodiment, for example, transceiver 310-2 may be arranged to communicate information in accordance with a second class of wireless communications protocols and techniques that are generally associated with a computer network. Examples of the second class of protocols may include WLAN protocols, such as one or more of the IEEE 802.xx series of protocols, such as IEEE 802.11a/b/g/n, IEEE 802.16, IEEE 802.20, and so forth. Other examples of the second class of protocols may include PAN protocols, Infrared protocols, Bluetooth protocols, EMI protocols including passive or active RFID protocols, and so forth. It may be appreciated that although the various protocols have been generally separated into a first class and a second class, it may be appreciated that transceivers 310-1, 310-2 may be arranged to use any type of protocol from either class as desired for a given implementation. It may also be appreciated that although RF chipset 312 is shown with two transceivers 310-1, 310-2 by way of example, RF chipset 312 may be implemented using more or less transceivers as desired for a given implementation. The embodiments are not limited in this respect.

In various embodiments, RF chipset 312 may be connected to baseband processor 314. Baseband processor 314 may perform baseband operations for radio sub-system 202. Baseband processor 314 may comprise both analog and digital baseband sections. The analog baseband section includes I & Q filters, analog-to-digital converters, digital-to-analog converters, audio circuits, and other circuits. The digital baseband section may include one or more encoders, decoders, equalizers/demodulators, GMSK modulators, GPRS ciphers, transceiver controls, automatic frequency control (AFC), automatic gain control (AGC), power amplifier (PA) ramp control, and other circuits. The embodiments are not limited in this context.

In various embodiments, baseband processor 314 may also be connected to one or more memory units via a memory bus 320. In one embodiment, for example, baseband processor 314 may be connected to a flash memory unit 316 and a secure digital (SD) memory unit 318. Memory units 316, 318 may be removable or non-removable memory. In one embodiment, for example, baseband processor 314 may use approximately 1.6 megabytes of static read-only memory (SRAM) for E-GPRS and other protocol stack needs.

In various embodiments, baseband processor 314 may also be connected to a subscriber identity module (SIM) 322. Baseband processor 314 may have a SIM interface for SIM 322. SIM 322 may comprise a smart card that encrypts voice and data transmissions and stores data about the specific user so that the user can be identified and authenticated to the network supplying voice or data communications. SIM 322 may also store data such as personal phone settings specific to the user and phone numbers. SIM 322 can be removable or non-removable. The embodiments are not limited in this context.

In various embodiments, baseband processor 314 may further include various interfaces for communicating with a host processor of processing sub-system 206. For example, baseband processor 314 may have one or more universal asynchronous receiver-transmitter (UART) interfaces, one or more control/status lines to the host processor, one or more control/data lines to the host processor, and one or more audio lines to communicate audio signals to an audio sub-system of processing sub-system 206. The embodiments are not limited in this context.

Figure 4:
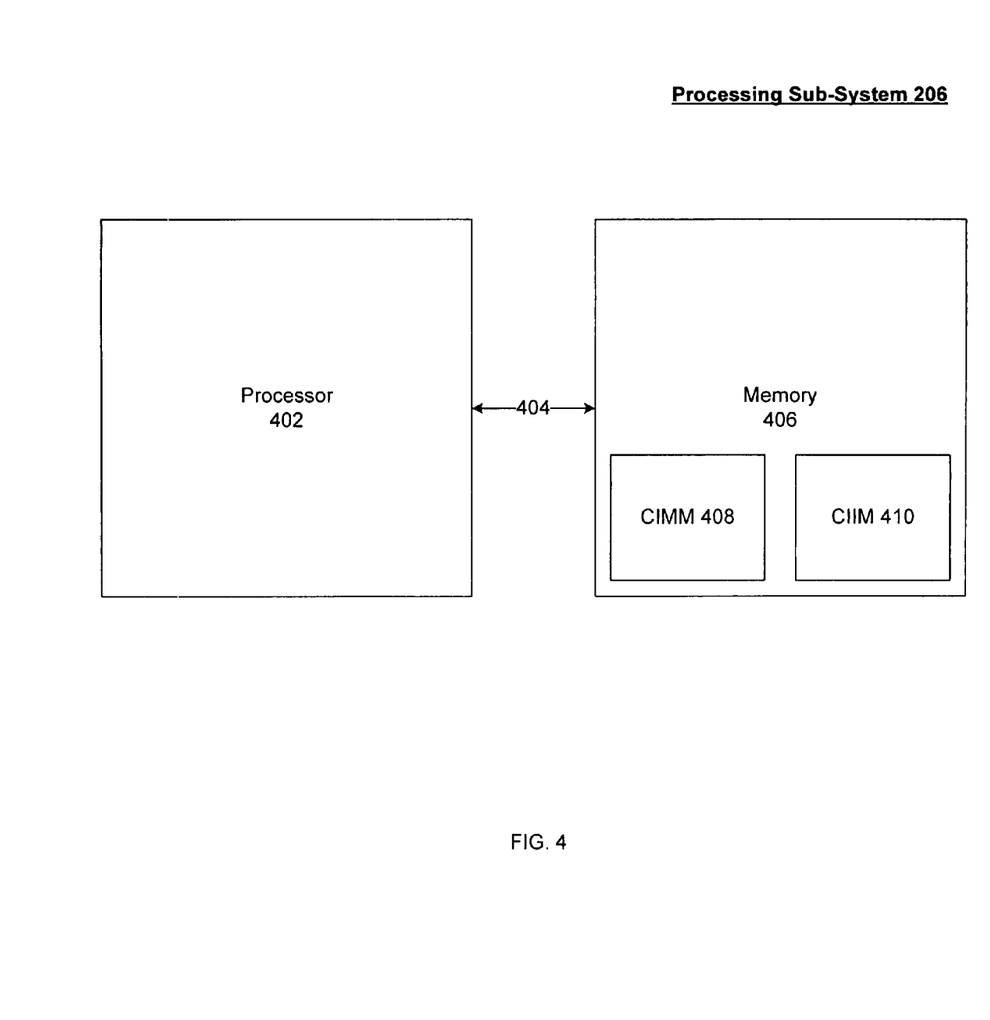
FIG. 4 illustrates one embodiment of a processing sub-system.

FIG. 4 illustrates one embodiment a processing sub-system. FIG. 4 illustrates a more detailed block diagram of processing sub-system 206 as described with reference to FIG. 2. Processing sub-system 206 may provide computing or processing operations for mobile computing device 110. For example, processing sub-system 206 may be arranged to execute various software programs for mobile computing device 110. Although processing sub-system 206 may be used to implement certain operations for various embodiments as software executed by a processor, it may be appreciated that the operations performed by processing sub-system 206 may also be implemented using hardware circuits or structures, or a combination of hardware and software, as desired for a particular implementation. The embodiments are not limited in this context.

In various embodiments, mobile computing device 110 may be capable of executing various types of software programs using processing sub-system 206. Software programs may be generally grouped into application programs and system programs. Application programs allow a user to accomplish one or more specific tasks. Typical applications include office suites, business software, educational software, databases, communications software, computer games, and so forth. Examples of application programs may include mail programs, web browsers, personal information manager applications, calendar programs, scheduling programs, contact management programs, gaming programs, word processing programs, spreadsheet programs, picture management programs, video reproduction programs, audio reproduction programs, groupware programs, and so forth. Most application software has a graphical user interface (GUI) to communicate information between a device and a user. System programs assists in the running of a computer system. System programs may be directly responsible for controlling, integrating, and managing the individual hardware components of the computer system. Examples of system programs may include operating systems (OS), device drivers, programming tools, utility programs, software libraries, interfaces, program interfaces, API, and so forth.

In various embodiments, processing sub-system 206 of mobile computing device 110 may be capable of executing various types of system programs, such as different OS. In computing, an OS is the system software responsible for the direct control and management of hardware and basic system operations. Additionally, it provides a foundation upon which to run application software such as word processing programs and web browsers. Mobile computing device 110 may utilize any OS suitable for smaller form factor devices, such as a Palm OS®, Palm OS® Cobalt, Microsoft Windows® CE, Microsoft Pocket PC, Symbian OS™, Embedix OS, and others. The embodiments are not limited in this context.

In various embodiments, processing sub-system 206 may include processor 402. Processor 402 may be implemented using any processor or logic device, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, processor 402 may be implemented as a general purpose processor, such as a processor made by Intel® Corporation, Santa Clara, Calif. Processor 402 may also be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), and so forth. The embodiments, however, are not limited in this context.

In one embodiment, processing sub-system 206 may include memory 406 to connect to processor 402. Memory 406 may be implemented using any machine-readable or computer-readable media capable of storing data, including both volatile and non-volatile memory. For example, memory 406 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 406 may be included on the same integrated circuit as processor 402 thereby obviating the need for bus 404. Alternatively some portion or all of memory 406 may be disposed on an integrated circuit or other medium, for example a hard disk drive, that is external to the integrated circuit of processor 402, and processor 402 may access memory 406 via memory bus 404. The embodiments are not limited in this context.

In various embodiments, memory 406 may store one or more software components. A software component may refer to one or more programs, or a portion of a program, used to implement a discrete set of operations. In one embodiment, for example, memory 406 may include various software components, such as a context information management module (CIMM) 408 and a context information interface module (CIIM) 410. It is worthy to note that although some embodiments may describe these modules as software components executed by processing sub-system 206, it may be appreciated that some or all of the operations of the software components may be implemented using other processors accessible by mobile computing device 110, such as baseband processor 314, for example. Furthermore, these modules may also be implemented using dedicated hardware circuits or structures, or a combination of dedicated hardware and software, as desired for a given implementation. The embodiments are not limited in this context.

In various embodiments, CIMM 408 may be arranged to search for context information. The context information may be stored in a personal contact list for a PIM application residing on mobile computing device 110, or in one or more context information databases. The context information may include any information associated with the incoming telephone number or individual that may assist a user in identifying the calling party or providing context for a telephone call. Examples of context information may include a name, a home address, a city, a state, a region, a zip code, an image, a video, an animation, a school, a business address, a business name, a business title, a gender, social relationships, and so forth. The context information may include any type or modality of information, including alphanumeric information, text information, audio information, video information, image information, symbol information, geographic or location information, graphics information, computer generated image (CGI) information, animation information, and so forth. The embodiments are not limited in this context.

In various embodiments, CIMM 408 may search for context information in accordance with information provided by CIIM 410. CIIM 410 may be arranged to store various parameters and definitions for use by CIMM 408. A manufacturer of mobile computing device 110 may store a set of default parameters and definitions. A user of mobile computing device 110 may also define or modify a set of parameters and definitions in order to personalize the operations of CIMM 408.

In various embodiments, CIIM 410 may allow a user to define various user profiles. Each user profile may include a set of defined context information fields that may be used by CIMM 408 to retrieve the context information desired for a telephone number. Each context information field may indicate a type of context information to be retrieved by CIMM 408. For example, a context information field may be defined for any type of desired context information associated with the telephone number, such as a telephone number field, a name field, a nickname field, an address field, a home address field, a city field, a state field, a region field, a zip code field, an image field (e.g., for a photograph), a school alumni field, a business address field, a business name field, a business title field, a gender field, a social relationship field (e.g., a mutual friend), and any other type of context information that may assist in identifying a potential caller.

A user may create and label each profile to personalize the type of context information to be displayed with the incoming call message. For example, a user may create a business profile having a set of context information fields such as a telephone number field, a name field, a business name field, and a business title field. In another example, a user may create a personal profile having a set of context information fields such as a telephone number field, a nickname field, and an image field for a photograph (if available). It may be appreciated that a user may define any number of profiles with any combination of context information fields as desired for a given implementation. The embodiments are not limited in this context.

In various embodiments, a user may also define how the context information for each profile is to be displayed on display 104. Each profile may also include metadata to define a format for the context information fields, with the format to indicate how the context information fields are to be displayed by display 104. For example, the user may specify that the business profile should have the business title positioned on a first line of display 104, the business name positioned on a second line of display 104, the caller name on a third line of display 104, and the telephone number on a fourth line of display 104. In another example, the user may specify that the personal profile should have the image displayed on a top-half of the display screen, with the nickname and telephone number to be displayed underneath. Details such as fonts, font size, colors, alignment, and other formatting options may be defined or set for each profile as well. The user selected options may be saved as metadata for each profile, for use by the given OS implemented for mobile computing device 110.

In various embodiments, a user may also create categories of callers and/or telephone numbers, and assign different profiles to different categories. For example, the user may assign a set of telephone numbers to a business category, and associate the business category with the business profile. In another example, the user may assign a set of telephone numbers to a personal category, and associate the personal category with the personal profile. A default profile may be used for those incoming telephone numbers not assigned to a specific category, or if the incoming telephone number is an unknown telephone number (e.g., no previous record stored by mobile computing device 110). The embodiments are not limited in this context.

In various embodiments, a user may define each profile and associated context information fields via a user interface associated with the resident OS implemented for mobile computing device 110 in general, or a user interface associated with CIIM 410 in particular. The user interface may be any type of user interface, such as a text interface, a graphics user interface (GUI), a voice command interface, and so forth. The embodiments are not limited in this context.

In general operation, mobile device 110 may receive an incoming call request for a telephone call. The call request may include a telephone number for the incoming call. CIMM 408 may search for context information associated with the telephone number. For example, CIMM 408 may search a personal contact list for a PIM application for a record associated with the telephone number. If a record associated with the telephone number is found in the personal contact list, CIMM 408 may retrieve certain context information from the located record. CIMM 408 may determine the particular set of context information to be retrieved from the located record in accordance with the information stored by CIIM 410. As previously described, CIIM 410 may define a set of parameters and definitions to specify the particular type of context information a user would like to be displayed, and how the context information should be displayed by display 104. Once CIMM 408 locates the context information, CIMM 408 may send the context information and/or metadata to an OS for mobile computing device 110 for display by display 104. The embodiments are not limited in this context.

In various embodiments, CIMM 408 may not find a record associated with the telephone number in the personal contact list. In this case, CIMM 408 may search alternative databases for context information typically found in a standard record provided by a conventional PIM application. Furthermore, CIMM 408 may search one or more context information databases for certain other desired context information as well.

In various embodiments, CIMM 408 may be arranged to search for context information using one or more context information databases. A context information database may refer to any database typically accessible by a network that may provide any searchable information to assist a user in determining whether to answer an incoming call request. Examples of a context information database may include a public database, a commercial database, a non-commercial database, a social database, a corporate database, a business database, a workgroup database, subscriber or fee based databases, dictionaries, encyclopedias, and any other network accessible databases. Examples of a public database may include a yellow page database, a white page database, an area code database, a government database, a census database, a mapping database, and any other publicly available database. Examples of social databases may include school alumni databases, personal network databases, and so forth. A personal networking database may comprise a database where each user may enter a list of names of other linked individuals known to the user, and the personal network database may cross-match the linked individuals to form new relationships between the users sharing a given linked individual. A workgroup database may be a specific working group for a project or corporate business operational group, such as research & development groups, human resources groups, legal groups, sales groups, marketing groups, and so forth. It may be appreciated that these are merely a few examples of a context information database, and many other context information databases exist that may be suitable for use with the embodiments as described herein. The embodiments are not limited in this context.

In one embodiment, CIMM 408 may attempt to retrieve context information from the context information database corresponding to the context information fields stored by CIIM 410. When attempting to retrieve the context information for a given context information field, CIMM 408 may access multiple context information databases in an attempt to find the desired context information. Similarly, CIMM 408 may access multiple context information databases to retrieve context information for different context information fields.

In various embodiments, CIMM 408 may search one or more context information databases for context information using a telephone number from a call request for an incoming telephone call. For example, mobile computing device 110 may receive an incoming call request to initiate a voice communication session. In addition to the incoming call request, mobile computing device 110 may also receive a telephone number for the calling device that initiated the call request. Mobile computing device 110 may receive the telephone number from a number of sources, such as from a caller identification service provided by the communication system service provider attempting to deliver the telephone call. CIMM 408 may use the telephone number to begin searching for context information relevant to the incoming call request or the caller initiating the call request. For example, CIMM 408 may search a personal contact list stored in memory 406. The personal contact list may comprise a list of records having personal information about an individual corresponding to each telephone number. The individual is typically the person that has been assigned the given telephone number when subscribing to a particular telephone service. Each record may include conventional subscriber information, such as a first name, last name, work address, home address, various contact numbers, an email address, and so forth. If CIMM 408 finds a record in the contact list corresponding to the incoming telephone number, CIMM 408 may retrieve the subscriber information from the record, and send the subscriber information to display 104 of mobile computing device 110. Display 104 may display all or a subset of the personal information and/or the incoming telephone number. For example, display 104 may display a message indicating a telephone number, a name associated with the telephone number, and a location associated with the telephone number. Consequently, display 104 may display the message "Bob Anderson, 123-456-7890, Business" for a user. The user may then read the displayed message, and determine whether to answer the incoming call based on the subscriber information provided by display 104.

In some cases, CIMM 408 may locate a record in the contact list for the telephone number. In this case, CIMM 408 may consider the telephone number to be a known telephone number. CIMM 408 may begin retrieving context information from the located record. Once CIMM 408 retrieves the available context information from the located record, CIMM 408 may make a determination as to whether any additional context information is needed beyond the context information found in the located record. This may be determined using the metadata and user profiles stored by CIIM 410. If CIMM 408 determines that additional context information is not needed, CIMM 408 may send the context information from the located record to the OS of mobile computing device 110 for display by display 104. If CIMM 408 determines that additional context information is needed, however, CIMM 408 may initiate a search of alternative sources of context information.

In various embodiments, CIMM 408 may search a cache as an alternative source of context information. Memory 406 may have a cache to store previously retrieved context information. CIMM 408 may search the cache in an attempt to locate any previously retrieved context information associated with the incoming telephone number. The cache may be managed using conventional techniques, such as deleting older entries to make room for new entries once the cache becomes full.

In various embodiments, CIMM 408 may search one or more context information databases for the additional context information. Once CIMM 408 retrieves the context information indicated by CIIM 410, or a terminating condition is reached (e.g., a timer indicates expiration of the time limit to search for the additional context information), CIMM 408 may send the context information for the located record and the additional context information to the OS of mobile computing device 110 for display by display 104. Display 104 may display a message for the incoming call with the context information, with the message having a format and content as indicated by CIIM 410. The embodiments are not limited in this context.

In some cases, CIMM 408 may not find a record in the contact list corresponding to the incoming telephone number. In this case, CIMM 408 may consider the telephone number to be an unknown telephone number. When detecting an unknown telephone number, CIMM 408 may initiate a search for context information associated with the unknown telephone number that may assist a user in determining whether to answer the incoming call request. For example, CIMM 408 may search a cache and/or one or more context information databases. As with a known telephone number, CIMM 408 may perform the search for context information in accordance with one or more profiles stored by CIIM 410.

In various embodiments, CIMM 408 may search any number and type of context information databases as desired for a given set of performance constraints. Since the setup time for a telephone call is relatively short, however, a terminating condition may be set to limit search times. For example, a time parameter may be set to limit the amount of time CIMM 408 may search for the desired context information. A timer may be used to implement the time limit. In this way, CIMM 408 may engage in a search for the context information and still ensure that the user has sufficient time to answer the telephone call in a timely manner. For example, if a typically setup time is 50 milliseconds (ms) between when a call request for an incoming call is received and a ring tone is executed to provide notice to a user, a user or CIMM 408 may set a time limit of 20 ms to perform the search for context information. It may be appreciated that these values are merely used by way of example, however, and the embodiments are not limited in this context.

In various embodiments, one or more context information databases may be stored locally by mobile computing device 110 via memory 406 or SIM 322. For example, a user may periodically download to mobile computing device 110 various commercial databases, such as a yellow pages directory, a white pages directory, an area code directory, and so forth. This may decrease an amount of time needed to search the locally stored context information databases. Mobile computing device 110 may use various techniques to optimize search times for the context information databases, such as loading the context information database to a non-volatile memory cache during initialization of mobile computing device 110, ordering or indexing the context information databases based on frequency, creating a cache for recently retrieved context information or likely retrieved context information (e.g., business contacts first, personal contacts second), and so forth. Any number of search algorithms may also be used to optimize search times. Alternatively, the context information database may also be stored remotely from mobile computing device 110, such as by a web server accessible via network 130. In the latter case, CIMM 408 may query the web server to retrieve the context information from the remotely stored context information database via wireless device 120 and network 130.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 5:
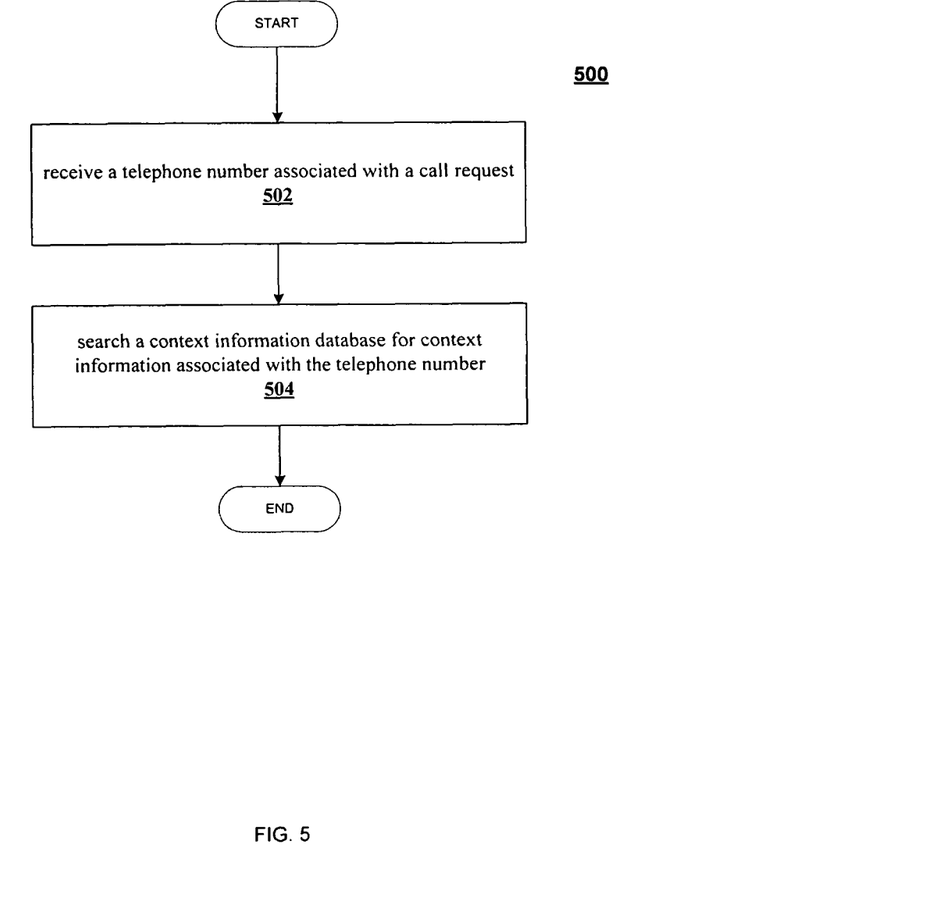
FIG. 5 illustrates one embodiment of a logic diagram.

FIG. 5 illustrates one embodiment of a logic flow. FIG. 5 illustrates a logic flow 500. Logic flow 500 may be representative of the operations executed by one or more embodiments described herein, such as mobile computing device 110. As shown in logic flow 500, a telephone number associated with a call request may be received at block 502. A context information database may be searched for context information associated with the telephone number at block 504. The embodiments are not limited in this context.

In one embodiment, a personal contact list may be searched for context information associated with the telephone number. In one embodiment, for example, the personal contact list may be searched before any context information databases. This may be accomplished since the personal contact list may have the highest likelihood of containing the desired context information, as well as the shortest search times due to the decreased size and optimized indexing relative to the context information databases. The embodiments are not limited in this context.

In one embodiment, a user profile may be defined having one or more context information fields. A set of telephone numbers may be assigned to a category or different categories. A user profile may be assigned to one or more categories.

In one embodiment, for example, the telephone number and context information may be displayed for a user. For example, assume an incoming telephone number is determined to be a telephone number as previously described. CIMM 408 may search various context information databases for the context information as defined by the context information fields stored by CIIM 410. Assume CIIM 410 has a context information field such as a state field. CIMM 408 may search an area code directory stored locally or on a web server, and determine that the area code for the incoming telephone call is within the state of California. CIMM 408 may send a message to the OS of mobile computing device 110 to display a message "408-555-1212 California" using display 104.

In one embodiment, for example, the context information may be retrieved over a data connection. For example, mobile computing device 110 may access a web server accessible via network 130 using radio sub-system 202. Mobile computing device 110 may establish a data connection with the web server via wireless device 120. CIMM 408 may use the data connection to search a database stored on the web server for the desired context information, and retrieve the context information if stored in the remote database.

In one embodiment, for example, the context information may be retrieved from a memory unit. For example, mobile computing device 10 may store one or more context information databases in memory 406, SIM 322, or some other memory unit implemented with mobile computing device 10. The context information databases may be downloaded from a public or private web server, or loaded into memory from a CD, prior to searching the context information databases for an incoming call request. The context information databases may also be cached or loaded into non-volatile memory in order to increase search speeds as desired for a given implementation.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using one or more hardware elements. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Various embodiments may be implemented using one or more software elements. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations. The software may be written or coded using a programming language. Examples of programming languages may include C, C++, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to memory 406. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. A mobile computing device, comprising:
a radio sub-system comprising a transceiver, the radio sub-system operative to receive an incoming call request for a telephone call;
a processing sub-system comprising a processor and a memory, the processing sub-system to couple to said radio sub-system;
the memory comprising a context information management module for execution by said processing sub-system, said context information management module to search for context information associated with a contact identifier in response to said incoming call request, said context information management module operative to search a personal contact list for said context information and to initiate a search of a context information database conditioned at least in part on an outcome of said search of said personal contact list, wherein said context information management module initiates said search of said context information database in response to determining that additional context information is needed beyond context information found in a record associated with said contact identifier in said personal contact list; and a context information interface module to store one or more user profiles, with each user profile to include a defined set of context information fields, said context information management module to retrieve, over a data connection using said radio sub-system, context information from said context information database corresponding to said context information fields.

2. The mobile computing device of claim 1, said memory to store said context information database, said context information management module to retrieve said context information from said context information database.

3. The mobile computing device of claim 1, comprising a context information interface module to assign a set of contact identifiers to a category.

4. The mobile computing device of claim 1, comprising a context information interface module to store one or more user profiles, with each user profile to include a defined set of context information fields and an assigned category.

5. The mobile computing device of claim 1, comprising a display to display said contact identifier and said context information.

6. The mobile computing device of claim 1, wherein said context information management module initiates said search of said context information database at least partly in response to not finding a record associated with said contact identifier in said personal contact list.

7. A method, comprising:
receiving by a mobile communication device an incoming call request for a telephone call;
receiving by the mobile communication device a contact identifier associated with the incoming call request;
searching a personal contact list for context information associated with said contact identifier;
initiating searching a context information database conditioned at least in part on an outcome of said searching said personal contact list, wherein said initiating said searching said context information database occurs in response to determining that additional context information is needed beyond context information found in a record associated with said contact identifier in said personal contact list
storing, by the mobile communication device, one or more user profiles, with each user profile to include a defined set of context information fields; and
retrieving, by the mobile communication device over a data connection using a radio sub-system of the mobile communication device, context information from said context information database corresponding to said context information fields.

8. The method of claim 7, comprising assigning a set of contact identifiers to a category.

9. The method of claim 7, comprising assigning a user profile to a category.

10. The method of claim 7, comprising retrieving said context information from a memory unit.

11. The method of claim 7, comprising displaying said contact identifier and said context information.

12. An article comprising a non-transitory machine-readable storage medium containing instructions that when executed enable a system to:
receive an incoming call request for a telephone call;
receive a contact identifier associated with the incoming call request;
search a personal contact list for context information associated with said contact identifier;
initiate a search of a context information database conditioned at least in part on an outcome of said search of said personal contact list, wherein initiation of said search of said context information database occurs in response to determining that additional context information is needed beyond context information found in a record associated with said contact identifier in said personal contact list;
store one or more user profiles, with each user profile to include a defined set of context information fields; and
retrieve, over a data connection using a radio sub-system, context information from said context information database corresponding to said context information fields.

13. The article of claim 12, further comprising instructions that when executed enable the system to assign a set of contact identifiers to a category.

14. The article of claim 12, further comprising instructions that when executed enable the system to assign a user profile to a category.

15. The article of claim 12, further comprising instructions that if when executed enable the system to retrieve said context information from a memory unit.

16. The article of claim 12, further comprising instructions that if when executed enable the system to display said contact identifier and said context information.

17. An apparatus, comprising:
means for receiving an incoming call request for a telephone call;
means for receiving a contact identifier associated with the incoming call request;
means for searching a personal contact list for context information associated with said contact identifier;
means for initiating said means for searching a context information database conditioned at least in part on an outcome of operations performed by said means for searching said personal contact list, wherein said means for initiating initiates said means for searching said context information database in response to a means for determining that additional context information is needed beyond context information found in a record associated with said contact identifier in said personal contact list;
means for storing one or more user profiles, each user profile including a defined set of context information fields; and means for retrieving, over a data connection using a radio sub-system, context information from said context information database corresponding to said context information fields.

* * * * *